United States Patent
Schroeter

(10) Patent No.: US 8,489,402 B2
(45) Date of Patent: *Jul. 16, 2013

(54) METHOD OF PROVIDING DYNAMIC SPEECH PROCESSING SERVICES DURING VARIABLE NETWORK CONNECTIVITY

(75) Inventor: Horst Schroeter, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,495

(22) Filed: Feb. 23, 2012

(65) Prior Publication Data

US 2012/0215542 A1 Aug. 23, 2012

Related U.S. Application Data

(63) Continuation of application No. 12/329,716, filed on Dec. 8, 2008, now Pat. No. 8,150,696.

(51) Int. Cl.
*H04M 1/72522* (2006.01)

(52) U.S. Cl.
USPC .................................................. 704/270.1

(58) Field of Classification Search
USPC .................................................. 704/270.1
See application file for complete search history.

(56) References Cited

U.S. PATENT DOCUMENTS 7,260,383 B1 8/2007 Ngan
8,150,696 B2 4/2012 Schroeter

*Primary Examiner* — Susan McFadden
(74) *Attorney, Agent, or Firm* — Greenblum & Bernstein, P.L.C.

(57) ABSTRACT

A client device for providing dynamic speech processing services during variable network connectivity with a network server includes a connection monitor that monitors network connectivity between the client device and the network server. The device further includes a simplified speech processor that processes speech data and is initiated based on an assessment from the connection monitor that the network connectivity is impaired. The device further includes a speech data storage that stores processed speech data from the simplified speech processor and a transmitter that is configured to transmit the stored speech data to the network.

20 Claims, 4 Drawing Sheets

METHOD OF PROVIDING DYNAMIC SPEECH PROCESSING SERVICES DURING VARIABLE NETWORK CONNECTIVITY

CROSS-REFERENCE TO RELATED APPLICATIONS

The present application is a continuation application of pending U.S. application Ser. No. 12/329,716, filed on Dec. 8, 2008, the contents of which are expressly incorporated by reference herein in its entirety.

BACKGROUND

1. Field of the Disclosure

The present disclosure relates to the field of communications. More particularly, the present disclosure relates to providing dynamic speech processing services during variable network connectivity.

2. Background Information

Some client devices are connected to network servers. These network servers often have speech processing capabilities, performed by speech processors instantiated on network servers. However, when the network connection is compromised and the connection to a network server is lost or impaired, client devices that are connected to the network servers are unable to perform speech processing.

DETAILED DESCRIPTION

Figure 1:
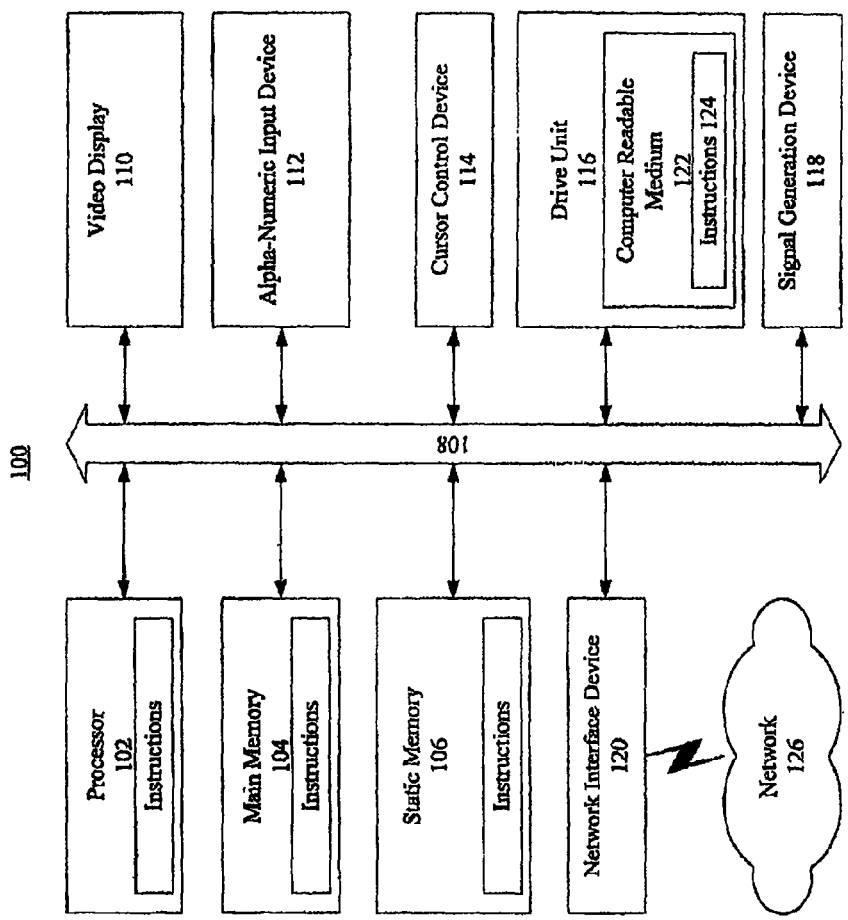
FIG. 1 shows an exemplary general computer system that includes a set of instructions for providing dynamic speech processing services during variable network connectivity.

In view of the foregoing, the present disclosure, through one or more of its various aspects, embodiments and/or specific features or sub-components, is thus intended to bring out one or more of the advantages as specifically noted below.

According to an aspect of the present disclosure, a client device for providing dynamic speech processing services during variable network connectivity with a network server includes a connection determiner that determines the level of network connectivity of the client device and the network server; a simplified speech processor that processes speech data that is initiated based on the determination from the connection determiner that the network connectivity is impaired or unavailable; a speech data storage that stores processed speech data from the simplified speech processor; and a transition unit that determines when to transmit the stored speech data and connects with the network server, based on the determination of the connection determiner.

In another aspect of the present disclosure, the transition unit transmits a request to the network server to reinitiate an extended speech processor of the network server, when the simplified speech processor of the client device has no pending transactions. Pending transactions include transactions wherein the speech processor is receiving speech data from a user or processing speech data.

In an aspect of the present disclosure, the simplified speech processor of the client device uses less processing power than the extended speech processor of the network server.

In another aspect of the present disclosure, a conservation user input that allow users to initiate the simplified speech processor.

In an aspect of the present disclosure, the simplified speech processor outputs a predetermined prompt to collect user input.

In yet another aspect of the present disclosure, the connection determiner categorizes the level of network connectivity of the client device and the network server, and the simplified speech processor selects one of a plurality of speech processing engines, based on the categorization of the connection determiner.

According to an aspect of the present disclosure, a method for providing dynamic speech processing services during variable network connectivity with a network server includes determining, at a client device, the level of network connectivity between the client device and the network server; initiating a simplified speech processor that processes speech data, based on the determination that the network connectivity is impaired or unavailable; storing processed speech data from the simplified speech processor; determining when to transmit the stored speech data; and connecting with the network server, based on the determination of the level of network connectivity.

In an aspect of the present disclosure, the method includes transmitting a request to the network server to reinitiate an extended speech processor of the network server, when the simplified speech processor of the client device has no pending transactions. Pending transactions include transactions wherein the simplified speech processor is receiving speech data from a user or the simplified speech processor is processing speech data.

In another aspect of the present disclosure, the simplified speech processor uses less processing power than the extended speech processor of the network server.

In an aspect of the present disclosure, the method includes receiving user input that initiates the simplified speech processor.

In another aspect of the present disclosure, the simplified speech processor outputs a predetermined prompt to collect user input.

In yet another aspect of the present disclosure, the method includes categorizing the level of network connectivity of the client device and the network server, and selecting one of a plurality of speech processing engines, based on the categorization of the connection determiner.

According to an aspect of the present disclosure, a tangible computer readable medium storing a program for providing dynamic speech processing services during variable network connectivity with a network server includes a connection determining code segment executable to determine the level of network connectivity of the client device and the network server; a simplified speech processing code segment executable to process speech data and is initiated based on the determination from the connection determining code segment that the network connectivity is impaired or unavailable; a speech data storage code segment executable to store processed speech data from the simplified speech processing code segment; and a transition code segment executable to determine when to transmit the stored speech data and connects with the network server, based on the determination of the connection determining code segment.

In an aspect of the present disclosure, the transition code segment transmits a request to the network server to reinitiate an extended speech processing code segment of the network server, when the simplified speech processing code segment of the client device has no pending transactions. Pending transactions include transactions wherein the simplified speech processor is receiving speech data from a user or the simplified speech processor is processing speech data.

In another aspect of the present disclosure, the simplified speech processing code segment uses less processing power than the extended speech processing code segment of the network server.

In an aspect of the present disclosure, the computer readable medium includes a conservation code segment that allow users to initiate the simplified speech processor.

In another aspect of the present disclosure, the simplified speech processing code segment outputs a predetermined prompt to collect user input.

In yet another aspect of the present disclosure, the connection determining code segment categorizes the level of network connectivity of the client device and the network server, and the simplified speech processing code segment selects one of a plurality of speech processing engines, based on the categorization of the connection determining code segment.

FIG. 1 is an illustrative embodiment of a general computer system, on which a method to provide dynamic speech processing services during variable network connectivity can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 126, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 102, for example, a central processing unit (CPU), a graphics processing unit (GPU), or both. Moreover, the computer system 100 can include a main memory 104 and a static memory 106 that can communicate with each other via a bus 108. As shown, the computer system 100 may further include a video display unit 110, such as a liquid crystal display (LCD), an organic light emitting diode (OLED), a flat panel display, a solid state display, or a cathode ray tube (CRT). Additionally, the computer system 100 may include an input device 112, such as a keyboard, and a cursor control device 114, such as a mouse. The computer system 100 can also include a disk drive unit 116, a signal generation device 118, such as a speaker or remote control, and a network interface device 120.

In a particular embodiment, as depicted in FIG. 1, the disk drive unit 116 may include a computer-readable medium 122 in which one or more sets of instructions 124, e.g. software, can be embedded. A computer-readable medium 122 is a tangible article of manufacture, from which sets of instructions 124 can be read. Further, the instructions 124 may embody one or more of the methods or logic as described herein. In a particular embodiment, the instructions 124 may reside completely, or at least partially, within the main memory 104, the static memory 106, and/or within the processor 102 during execution by the computer system 100. The main memory 104 and the processor 102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 122 that includes instructions 124 or receives and executes instructions 124 responsive to a propagated signal, so that a device connected to a network 126 can communicate voice, video or data over the network 126. Further, the instructions 124 may be transmitted or received over the network 101 via the network interface device 120.

Figure 2:
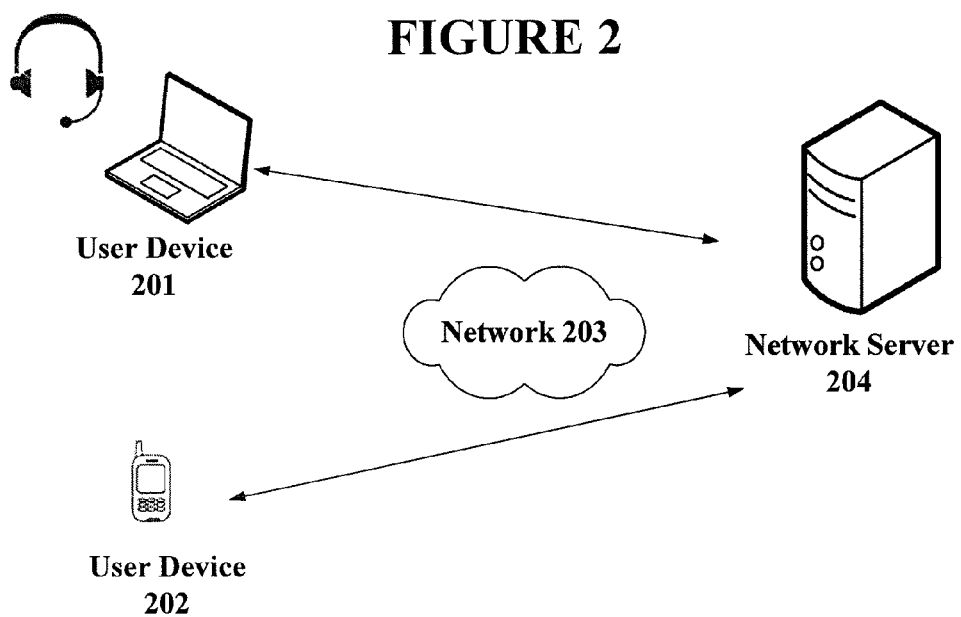
FIG. 2 illustrates an exemplary network connection between a client device and a network server, according to an aspect of the present disclosure.

FIG. 2 illustrates an exemplary network connection between a client device and a network server, according to an aspect of the present disclosure. Various types of client devices use speech processing services via network servers, including cell phones, personal digital assistants, MP3 players, satellite radio systems, etc. In FIG. 2, exemplary client devices 201 may be used by users in an analog, digital, or IP telephone network systems. Thus, the network system may be a public switched telephone network (PSTN), a cellular telephone network, a digital telephone network system, a voice over internet protocol (VOIP) telephony network system, or any other audible communication network.

In the exemplary architecture in FIG. 2, user devices 201 and 202 are connected to a network communication node, e.g., network server 204. User devices 201/202 may be connected to network server 204 via one or multiple networks, e.g., networks 203. It is understood that the network communication node may be implemented in any data network(s)

accessible by the users, including (but not limited to) wide area networks (WANs), PSTNs, and the internet (using, e.g., voice over internet protocol), without departing from the spirit and scope of the present disclosure.

In an exemplary embodiment, user device 201 or 202 determines the level of network connectivity of user device 201/202 and network server 204. When user device 201/202 determines that network connectivity is impaired or unavailable, a simplified speech processor, which is stored on the user device 201/202, is initiated. Then, user device 201/202 stores the processed speech data, including information on all decisions made and which dialog paths are taken, from the simplified speech processor. Furthermore, when the user device 201/202 determines that the network connectivity is no longer impaired, user device 201/202 transmits a message to network server 204, instructing network server 204 to reinitiate the speech processor, stored on network server 204.

Figure 3:
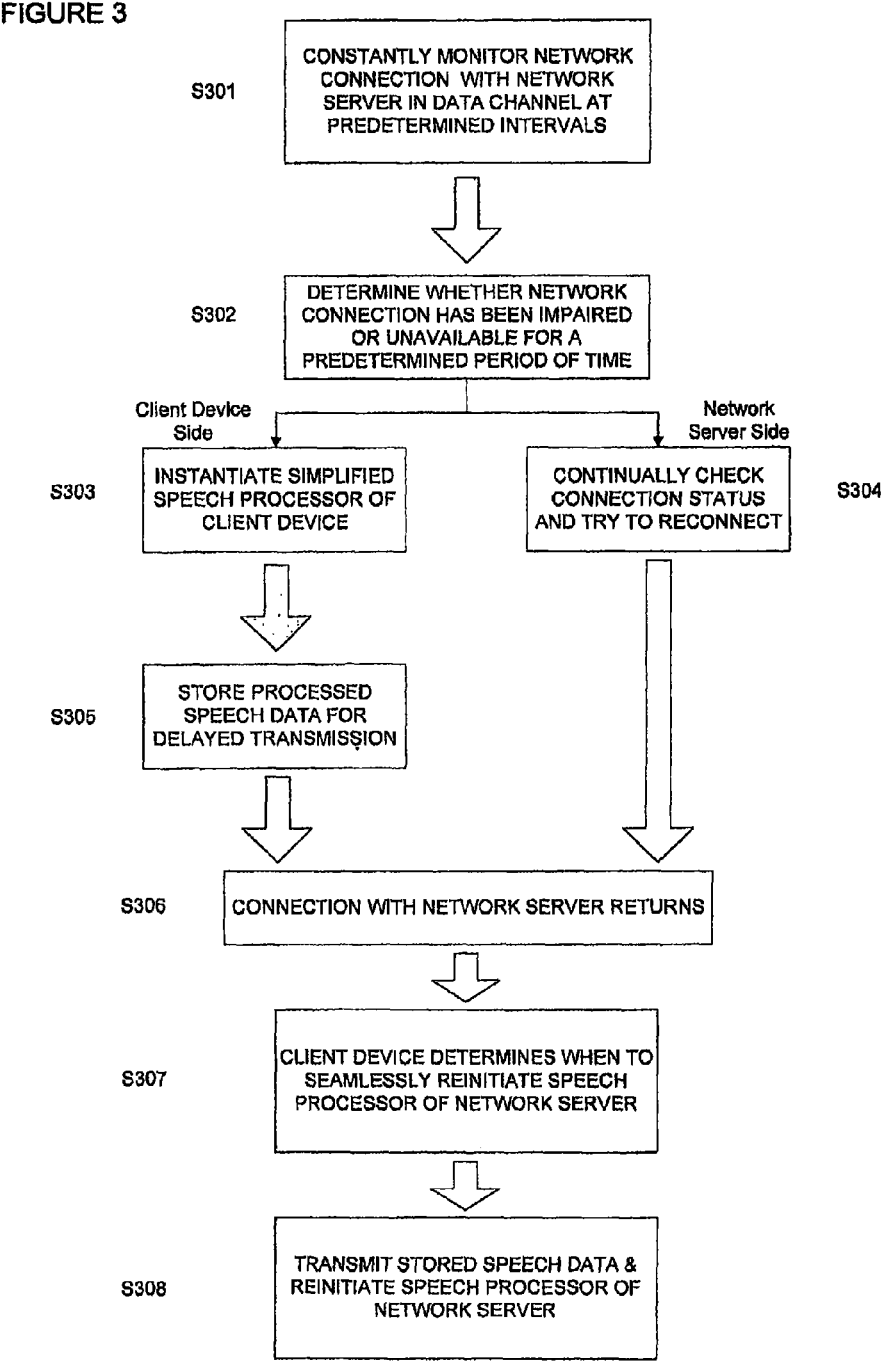
FIG. 3 is a flowchart depicting an exemplary process of providing dynamic speech processing services during variable network connectivity, according to an aspect of the present disclosure.

FIG. 3 is a flowchart depicting an exemplary process for providing dynamic speech processing services during variable network connectivity, according to an aspect of the present disclosure. During normal connectivity between the network server and the client device, the client devices utilizes speech processing engines stored in the network server. In step S301, a connection determiner (which includes hardware and/or software elements) of the client device constantly monitors the connection between the network server and the client device. In one embodiment, the connection is monitored at predetermined intervals, e.g., every 20 milliseconds. In step S302, the connection determiner determines whether the network connection has been impaired or unavailable for a predetermined period of time, e.g., for five seconds.

In another embodiment, the connection determiner categorizes or quantifies the level of connectivity between the network server and the client device. For example, the connection determiner assigns predetermined values (e.g., from 1 to 5 with one being the poorest connectivity and 5 being the best connectivity) to predetermined ranges of data transfer rates. For example, the connection determiner may assign a value of 5 to a data transfer rate of 1.0 mbps or higher.

If the network connection has been impaired or is unavailable for this predetermined period of time, then the client device initiates a simplified speech processor (which includes hardware and/or software elements) stored on the client device in step S303. In one embodiment, this simplified speech processor does not rely upon the speech processing of the network server, and uses less computing power compared to the extended or non-simplified speech processors stored in the network server. Therefore, when network connectivity is impaired or unavailable, the client device is capable of utilizing automatic speech recognition (ASR) or other speech processing engines. At a minimum, automatic speech recognition (ASR) or speech processing engines are being used to recognize and process spoken words, converting the spoken words to machine-readable input. Examples of conventional automatic speech recognition or speech processing engines include (but are not limited to) speech recognition software, such as CMU Sphinx, Hidden Markov Model Toolkit (HTK), VoxForge, Xvoice, Open Mind Speech, GnomeVoiceControl, CSLU Toolkit, IBM ViaVoice, and Microsoft Speech API.

Other speech processing engines include text-to-speech (TTS) synthesis engines, dialog manager (DM), natural language understanding (NLU) engines, and language generation (LG) engines. Examples of TTS engines include Nuance Specify and AT&T's Natural Voices. These engines convert machine-stored text into speech. NLU engines, such as, for example, AT&T's Watson NLU, extract meaning (e.g., an action item) from machine-readable text. Dialog manager engines are responsible for providing back-office services, such as database access (e.g., looking up account balances), and also keep track of the state of the dialog between the automated system and the user (e.g., judging whether a user speech input was misrecognized and whether a re-prompt is needed or not). Dialog manager engines also determine the next step to take in the dialog. Finally, an LG engine generates written text, such as the next dialog prompt to be synthesized by the TTS engine and output to the user, from intent information (for example, a prompt asking for account number).

Simultaneously, in step S304, the client device continually checks the connection with the network server (e.g., by sending "keep alive" messages to the network server), attempting to reconnect with the network server.

In one aspect of the present disclosure, the simplified speech processor of the client device provides a simplified speech processing engine, which uses less computing power than the speech processor stored in the network server. In one embodiment, this simplified speech processing engine may be a simple machine directed speech-enabled processor. The simplified machine-directed speech-enabled processor provides predetermined prompts to the user, which may be voice prompts or text prompts displayed on a screen, or may be generated by a TTS engine. The simplified machine-directed speech processing contrasts with any server-based, mixed-initiative dialog system that contains many, if not all, of the different kinds of speech engines discussed above.

For example, a user may choose to instruct the client device to record a particular TV program on a remote DVR device at a particular time. The simplified machine-directed speech processor would first prompt the user to indicate what operation the user wishes to be performed. For example, the speech process may output an audible prompt, such as "Select Action" or "What action would you like performed?". The user's spoken response to the prompt may be, for example, "Record Program", "DVR", etc.

Using conventional speech recognition software, the simplified machine-directed speech processor will then recognize and process the speech input or speech data. Based on this processed speech data, the speech processor will output additional prompts to the user. For example, after the user indicates the action "Record TV program", the speech processor may output the prompt "What TV program?" or "What TV program do you wish to record?". Based on this process speech data, the speech processor may output additional prompts, such as "What Time?" or "What Day of the Week?". This kind of simplified speech processing paradigm contrasts with any more sophisticated processing possible on more powerful network servers. For example, a sophisticated or extended natural-language speech recognition engine, running on a network server, would be capable of correctly interpreting the spoken command "Record Desperate Housewives next Sunday".

In another aspect of the present disclosure, the speech processor may select and utilize one of a plurality of speech processing engines, based on the quantified level of connectivity between the network server and the client device, as discussed above. Thus, if the quantified level of connection between the network server and the client device is the lowest quantified value (e.g., 1 out of a range from 1 to 5), then the speech processor will select a speech processing engine, which uses the least computing power. For example, the speech processor may use a local, device-based speech processing engine that uses a machine-directed speech-enabled engine that outputs speech or text prompts (as discussed above).

In one aspect of the present disclosure, this simplified speech processor may provide a prompt that includes a numbered list of possible operations. This prompt may be a an audible representation or text displayed on the screen of the client device. In response to the prompt, the user may say the predetermined selection provided in the prompt or the number associated with one of the predetermined selections provided in the prompt. In contrast, if the quantified level of connection between the network server is higher (e.g., 3 out of a range of 1 to 5), the speech processor will select and utilize a speech processing engine that uses more computing power. In this instance, the speech processor may also partially rely on computing power from the network server.

In step S305, after the speech processor of the client device processes the user's speech data or speech input, a speech data storage (which includes hardware and/or software elements) stores or caches the processed speech data. In step S306, the connection determiner determines that the connection between the network server and the client has been re-established or the quantified level of connectivity has reached a predetermined threshold. Therefore, in step S306, the connection between the network server and the client device is re-established. Then, in step S307, a transition unit (which includes hardware and/or software elements) determines when to reinitiate the speech processor of the network server. Specifically, the transition unit determines if there is a pending transaction being performed by the speech processor of the client device. For example, the transition unit determines if the speech processor is in the process of receiving speech data from the user or determines whether speech data is being processed.

Then, in step S308, the transition unit reinitiates the speech processor of the network server, based on step S207. In step S308, the transition unit also transmits the stored speech data in the speech data storage. In another embodiment, stored speech data can be transmitted to the user, when the connection determiner determines that the network connection has been re-established or when the connectivity level is sufficient to facilitate transmission of the speech data.

Figure 4:
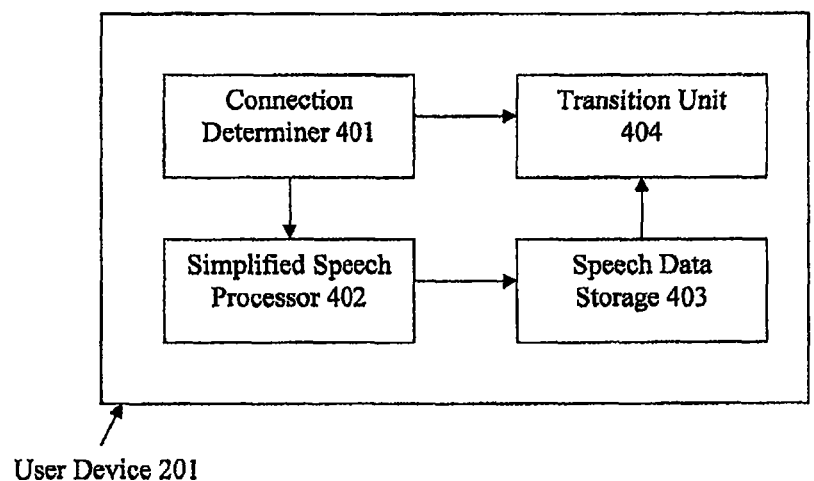
FIG. 4 illustrates an exemplary client device, according to an aspect of the present disclosure.

FIG. 4 illustrates an exemplary client device 201, according to an aspect of the present disclosure. As discussed above, FIG. 4 illustrates exemplary components (which include hardware and/or software elements) of client device 201, including connection determiner 401, simplified speech processor 402, speech data storage 403, and transition unit 404. Speech determiner 401 determines the level of network connectivity of the client device and the network server. Simplified speech processor 402 processes speech data and is initiated based on the determination from the connection determiner that the network connectivity is impaired or unavailable. Speech data storage 403 stores processed speech data from the simplified speech processor; and transition unit 404 determines when to transmit the stored speech data and connects with the network server, based on the determination of the connection determiner.

Accordingly, the present disclosure enables dynamic speech processing services during variable network connectivity by client devices using simplified speech processors. The present disclosure also enables seamless re-initiation of network-based speech processors, when the network connection has been re-established.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the present disclosure may be implemented to control and conserve computing power and energy. For example, the present disclose may also comprise an energy or computing power conservation setting, which the user may turn on and off, which initiates the simplified speech processor. Furthermore, this energy or computing power conservation setting may include a range of settings, which each corresponds to a plurality of simplified speech processing engines. For example, the user may select conservation settings ranging from 1 to 5, wherein setting "1" uses the least energy and computer power and setting "5" uses the most energy and computer power. Based on the setting selected by the user, the speech process will select one of a plurality of speech processing engines that use a variety of levels of computer power, as discussed above.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission standards and protocols for the Internet and other packet switched network transmission, e.g., SRGS (Speech Recognition Grammar Specification), SISR (Semantic Interpretation for Speech Recognition), SSML (Speech Synthesis Markup Language), PLS (Pronunciation Lexicon Specification), CCXML (Call Control Extensible Markup Language), represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A client device for providing dynamic speech processing services during variable network connectivity with a network server, comprising:
    a connection monitor that monitors network connectivity between the client device and the network server;
    a simplified speech processor that processes speech data and is initiated based on an assessment from the connection monitor that the network connectivity is impaired;
    a memory that stores processed speech data from the simplified speech processor; and
    a transmitter configured to transmit the stored speech data to the network server.

2. The client device according to claim 1,
    wherein the transmitter transmits a request to reinitiate an extended speech processor of the network server to seamlessly reinitiate the extended speech processor.

3. The client device according to claim 2,
    wherein the simplified speech processor of the client device uses less processing power than the extended speech processor of the network server.

4. The client device according to claim 2,
    wherein the request to reinitiate the extended speech processor is transmitted during a time when the simplified speech processor is not receiving speech data from a user.

5. The client device according to claim 2,
    wherein the request to reinitiate the extended speech processor is transmitted during a time when the simplified speech processor is not processing speech data.

6. The client device according to claim 1,
    wherein the connection monitor continuously monitors a level of network connectivity between the client device and the network server.

7. The client device according to claim 1,
    wherein the connection monitor quantifies a level of network connectivity between the client device and the network server, and the simplified speech processor selects one of a plurality of speech processing engines, based on the quantification level.

8. A method for providing dynamic speech processing services during variable network connectivity with a network server, comprising:
    monitoring, at a client device, network connectivity between the client device and the network server;
    initiating a simplified speech processor that processes speech data, based on an assessment that the network connectivity is impaired;
    storing processed speech data from the simplified speech processor; and
    transmitting the stored speech data to the network server.

9. The method according to claim 8, further comprising:
    transmitting a request to reinitiate an extended speech processor of the network server to seamlessly reinitiate the extended speech processor.

10. The method according to claim 9,
    wherein the simplified speech processor uses less processing power than the extended speech processor of the network server.

11. The method according to claim 9,
    wherein the request to reinitiate the extended speech processor is transmitted during a time when the simplified speech processor is not receiving speech data from a user.

12. The method according to claim 9,
    wherein the request to reinitiate the extended speech processor is transmitted during a time when the simplified speech processor is not processing speech data.

13. The method according to claim 8,
    wherein the monitoring comprises continuously monitoring a level of network connectivity between the client device and the network server.

14. The method according to claim 8, further comprising:
    quantifying a level of network connectivity between the client device and the network server, and
    selecting one of a plurality of speech processing engines, based on the quantification level.

15. A non-transitory computer readable storage medium encoded with an executable computer program for providing dynamic speech processing services during variable network connectivity with a network server and that, when executed by a processor, causes the processor to perform operations comprising:

monitoring network connectivity between a client device and the network server;

initiating a simplified speech processor that processes speech data, based on an assessment that the network connectivity is impaired;

storing processed speech data from the simplified speech processor; and transmitting the stored speech data and connecting with the network server.

16. The non-transitory computer readable storage medium according to claim 15, wherein the transmitting comprises transmitting a request to reinitiate an extended speech processor of the network server to seamlessly reinitiate the extended speech processor.

17. The non-transitory computer readable storage medium according to claim 16, wherein the simplified speech processor uses less processing power than the extended speech processor of the network server.

18. The non-transitory computer readable storage medium according to claim 16, wherein the request to reinitiate is transmitted during a time when the simplified speech processor is not receiving speech data from a user.

19. The non-transitory computer readable storage medium according to claim 16, wherein the request to reinitiate the extended speech processor is transmitted during a time when the simplified speech processor is not processing speech data.

20. The non-transitory computer readable storage medium according to claim 15, wherein the monitoring comprises quantifying a level of network connectivity between the client device and the network server, and wherein the simplified speech processor selects one of a plurality of speech processing engines, based on the quantification level.

* * * * *